United States Patent [19]
Kuriyama et al.

[11] Patent Number: 6,154,580
[45] Date of Patent: Nov. 28, 2000

[54] TACTILE SENSOR AND FINGERPRINT SENSOR USING SAME

[75] Inventors: Toshihide Kuriyama; Michihisa Suga, both of Tokyo, Japan

[73] Assignee: NEC Corporation, Tokyo, Japan

[21] Appl. No.: 09/123,497

[22] Filed: Jul. 28, 1998

[30] Foreign Application Priority Data

Jul. 28, 1997 [JP] Japan ................................ 9-201827

[51] Int. Cl.$^7$ .............................. G06K 7/00; G06K 9/00; G06K 11/00
[52] U.S. Cl. .......................... 382/312; 382/115; 250/556
[58] Field of Search ................................ 382/312, 115, 382/124, 100, 120; 250/556, 208.1, 221

[56] References Cited

U.S. PATENT DOCUMENTS

| | | | |
|---|---|---|---|
| 4,429,413 | 1/1984 | Edwards | 382/124 |
| 4,577,345 | 3/1986 | Abramov | 382/124 |
| 5,325,442 | 6/1994 | Knapp | 382/124 |
| 5,503,029 | 4/1996 | Tamori | 73/862.046 |
| 5,635,723 | 6/1997 | Fujieda et al. | 250/556 |

FOREIGN PATENT DOCUMENTS

| | | |
|---|---|---|
| 61-222178 | 10/1986 | Japan . |
| 61-222179 | 10/1986 | Japan . |
| 5-61965 | 3/1993 | Japan . |
| 5180866 | 7/1993 | Japan . |
| 6-288846 | 10/1994 | Japan . |
| 8-68704 | 3/1996 | Japan . |
| 9-126918 | 5/1997 | Japan . |
| 10-200129 | 7/1998 | Japan . |

*Primary Examiner*—Jose L. Couso
*Assistant Examiner*—Duy M. Dang
*Attorney, Agent, or Firm*—Young & Thompson

[57] ABSTRACT

A fingerprint sensor is disclosed, which employs a plurality of tactile sensors, each has an elastic insulating body between a member of an electrically conductive material, i.e., a gate electrode, and an insulating film deposited on a channel region of a field-effect transistor (FET). The channel region is formed between a source region and a drain region. Each of the tactile sensors is connected in series with a transistor that serves as a source of constant or steady current to form a source follower circuit. With the source follower circuit, output of each of the tactile sensors is converted into source voltage. The source voltage of each of the source follower circuits is extracted via a first switching element at a common output terminal. The source follower circuits are connected via a second switching element to a source of electric power.

8 Claims, 5 Drawing Sheets

TACTILE SENSOR AND FINGERPRINT SENSOR USING SAME

FIELD OF THE INVENTION

The present invention relates to a fingerprint sensor, and more particularly to a fingerprint sensor, which is compact and can be mounted in a very thin sheet.

BACKGROUND OF THE INVENTION

An optical fingerprint sensor is known, which uses a prism and a photoelectric converter. The photoelectric converter converts incident light rays reflected by ridges and valleys of finger surface that is in contact with a surface of the prism.

A fingerprint sensor using a pressure sensitive sheet is known. Arranged in a matrix form on the pressure sensitive sheet are electrodes, Distribution of electrical resistance over the whole area of the sheet is altered by ridges and valleys of finger surface that is in contact with a surface of the sheet.

A fingerprint sensor is known, which uses capacitance formed between a pair of electrodes on surface of an insulator. Distribution of capacitance varies in response to ridges and valleys of finger surface that is contact with surface of the sensor.

JP-A 5-61965 discloses a fingerprint sensor including a number of sensor elements arranged in a matrix form on a semiconductor substrate. Each sensor element includes a piezoelectric thin-film, a switching field-effect transistor (FET), and a FET for impedance conversion and/or output amplification.

JP-A 61-222178 discloses a pressure sensor using a FET. According to this known pressure sensor, an elastic insulating layer is deposited on a gate insulating film that is deposited on a channel region of the FET between a source region and a drain region, and a gate electrode is formed on the elastic insulating layer. When the gate electrode is subjected to mechanical stress, the pressure sensor detects the stress as variation in the drain current. The drain current is proportional to the magnitude of stress applied to the gate electrode. This is because the drain current varies with electric field applied to the channel region, and the strength of this electric field varies with variation in distance between the gate electrode and the gate insulating film. To increase a ratio of the distance to the stress, the elastic insulating layer is formed with an opening above the channel region.

In the prior art, the optical fingerprint sensor requires a source of light and a photoelectric converter such as a CCD camera, resulting in a bulky and expensive apparatus.

The fingerprint sensor using a pressure sensitive sheet is difficult to fabricate due mainly to electrically conductive rubber is used to form the pressure sensitive sheet. Thus, quality and reliability control is difficult.

The fingerprint sensor, which uses capacitance formed between a pair of electrodes on surface of an insulator, is susceptible to occurrence of current leak due to stain on the sensor surface.

The fingerprint sensor, which is disclosed by JP-A 5-61965, is susceptible to a drop in its output because electric charge decreases in response to current leak within the piezoelectric thin film.

The pressure sensor, which is disclosed by JP-A 61-222178, uses a FET. As is well known, the FETs exhibits temperature dependent characteristics. Thus, a sensor using FET alone has a potential problem that output of the FET must be corrected to compensate for a deviation due to change in temperature. The elastic insulating layer deforms upon application of a force to be measured is applied to the gate electrode. The ratio of vertical distance between the gate electrode and the gate insulating film to the magnitude of force applied cannot be improved to a satisfactorily high level. This is because the deformation of the elastic insulating layer in horizontal directions is limited and cannot be expected to such a degree as to provide a desired increase in the vertical deformation. Thus, this known pressure sensor cannot be employed as a sensing element of a fingerprint sensor.

The present invention provides a tactile sensor, which may be employed as a sensing element in a fingerprint sensor.

An object of the present invention is to provide a compact and thin fingerprint sensor, which can detect fingerprint image of a finger surface with high fidelity and stability over wide range of varying temperatures.

SUMMARY OF THE INVENTION

According to one aspect of the present invention, a fingerprint sensor employs a plurality of tactile sensors, each has an elastic insulating body between a member of an electrically conductive material, i.e., a gate electrode, and an insulating film deposited on a channel region of a field-effect transistor (FET). The channel region is formed between a source region and a drain region. Each of the tactile sensors is connected In series with a transistor that serves as a source of constant or steady current to form a source follower circuit. With the source follower circuit, output of each of the tactile sensors is converted into source voltage. The source voltage of each of the source follower circuits is extracted via a first switching element at a common output terminal. The source follower circuits are connected via a second switching element to a source of electric power. Use of the source follower circuits in processing output of each of tactile sensors reduces output resistance and a change in characteristic of FET in response to a change in temperature.

According to further aspect of the present invention, the elastic Insulating body extends, in an unstressed state, from the gate electrode toward the insulating film by a depth and extending between the source and drain region by a width, and the depth is at least equal to the width. In other words, the depth is greater than or equal to the width. Specifically, the insulating elastic body has a rectangular cross sectional profile that measures the depth by the width. As the elastic insulating body can deform in such directions as to increase the width, the ratio of the distance between the gate electrode and the insulating film to the magnitude of input force increases, resulting in Increased sensitivity of the sensor. The increase in sensitivity of each of the tactile sensors contributes greatly to improvement of fidelity of the fingerprint sensor, Further, the channel region of the FET may be divided by at least one heavily doped region, which has dopant with the same conductivity type as that of the source and drain regions, into a plurality of sensor regions. A plurality of elastic insulating bodies are disposed between gate electrodes and insulating film on the channel region such that each of the elastic insulating body is arranged over one of the sensor regions.

The fingerprint sensor may include a scanner that sequentially read out outputs of the plurality of tactile sensors.

The fingerprint sensor may include a metal-oxide-semiconductor field-effect transistor (MOSFET) adjacent one of the plurality of tactile sensors to form a pair. The MOSFET and the tactile sensor of each pair exhibit the same transistor characteristics. Each of the MOSFETs is connected in series with a transistor that serves as a source of constant or steady current to form a source follower circuit, In order to eliminate the interference of noise, the fingerprint sensor measures a difference between source voltage of the source follower circuit for the tactile sensor of each pair and source voltage of the source follower circuit for the MOSFET of the same pair.

The fingerprint sensor may include a scanner for sequentially measuring the voltage difference of the source follower circuits of the plurality of pairs.

DESCRIPTION OF THE PREFERRED EMBODIMENTS

Referring to the accompanying drawings, the embodiments according to the present invention are described.

[First Embodiment]

Figure 1:
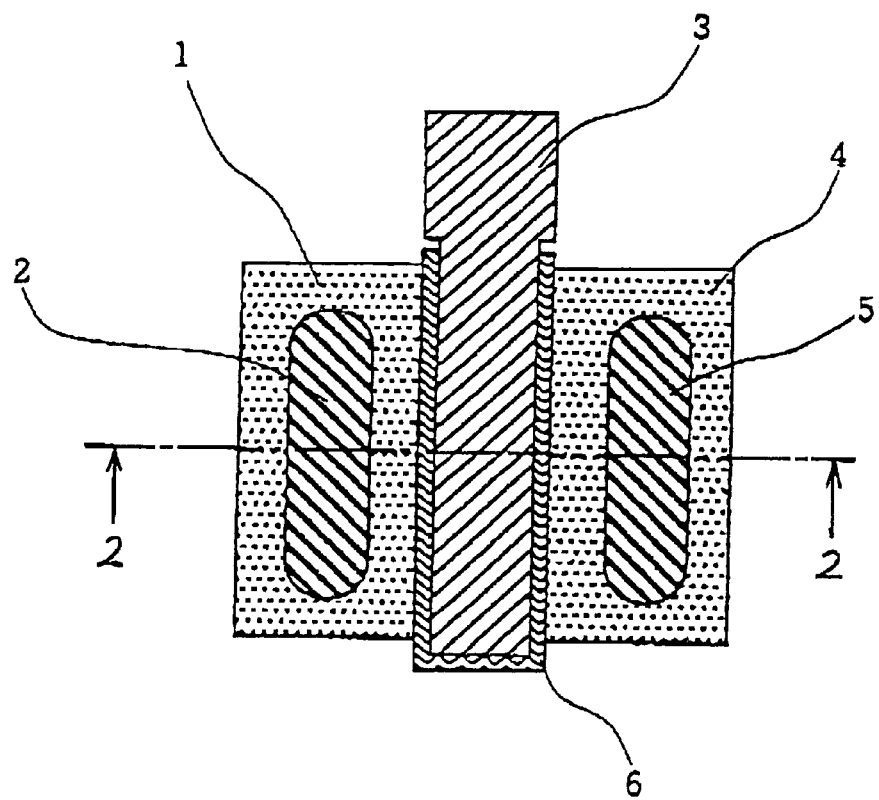
FIG. 1 is a schematic a plan view of a first embodiment of a tactile sensor.
Figure 2:
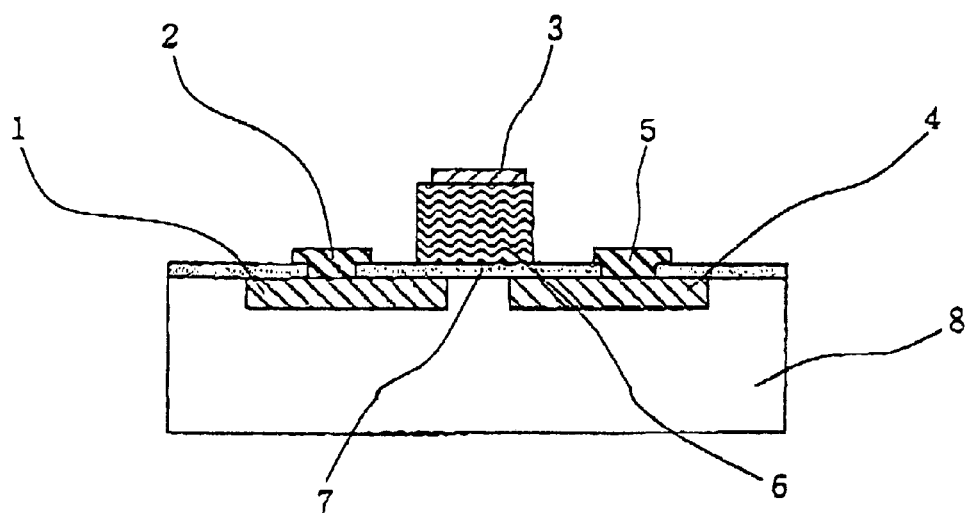
FIG. 2 is a section taken through the line 2—2 in FIG. 1.

FIGS. 1 and 2 show a source region 1, a source electrode 2, a member of electrically conductive material or gate electrode 3, a drain region 4, an elongate elastic insulating body 6 of insulating material, an insulating film 7, and a silicon (Si) substrate 8.

A field-effect transistor (FET) employed by the present embodiment is substantially the same, in construction, as the usual metal-oxide-semiconductor field-effect transistor (MOSFET) except the provision of a sensing portion. The elongate elastic body 6 constitutes this sensing portion and it is made, for example, of a silicone resin and has a rectangular cross sectional profile as shown in FIG. 2. The elastic body 6 is arranged over a channel region between the source and drain regions 1 and 4, The insulating film 7 is interposed between the elastic body 6 and the channel region.

As viewed in FIG. 2, pressing down the gate electrode 3 causes the elastic body 6 to elastically contract vertically and expand horizontally. This horizontal expansion makes the vertical contraction easy. Thus, a tactile sensor with a fairly good response can be fabricated. With regard to the dimension, if, for example, the distance between the source and drain regions 1 and 4 is 5 micron meters ($\mu$m), the elastic body 6 should measure 8 micron meters thick (or in height) and 7 micron meters wide. It is recommended in fabricating a tactile sensor that a thickness of the elastic body 6 is at least equal to a width thereof. In the case that the elastic body 6 is formed of silicone resin with Young's modulus of about 20,000 newtons/m$^2$ per an unit strain (or displacement), the thickness (or height) of the elastic body 6 decreases about 10% under a contraction stress of 2,000 newtons/m$^2$. Under this condition, the output of source follower circuit changes at a rate about half as much as a rate at which the insulating film 7 changes. Thus, the output as much as about 5% of the gate voltage can be obtained. If, for example, the effective gate voltage is 5 V, the output of 350 mV is obtained.

[Second Embodiment]

Let us consider the case where the expected resolution on a fingerprint sensor is not too high. For example, the resolution of 50 micron meters ($\mu$m) angle is expected. In this case, what may be employed, as a tactile sensor, is a FET, the size of which is such that its source region 1 is appreciably distant from its drain region 4. The present invention is embodied, as the second embodiment, in a structure where there is an appreciable distance between the source and drain regions 1 and 4. This second embodiment is substantially the same as the first embodiment except that a region between the source and drain regions 1 and 4 is divided by at least one heavily doped region 9 into at least two sensor regions. An elongate elastic insulating body 106 is arranged over each of the section, and a gate electrode 103 is placed on each elastic body 106. Specifically, the two heavily doped regions 9 divide the region between the source and drain regions 1 and 4 into three sections, three elongate elastic bodies 106 bridge the three sections, respectively, and three gate electrodes 103 are deposited on the elastic bodies 106, respectively.

With regard to the dimension, the heavily doped regions 9 divide the channel region, which has appreciable distance between the source and drain regions 1 and 4, into the sensor regions, each having a narrow width. Thus, the elastic bodies 106 can maintain their desired proportion that the depth (or height) is at least equal to the width. Further, a clearance that exists between the adjacent elastic bodies 106 avoids interference between them upon the force detection.

Figure 3:
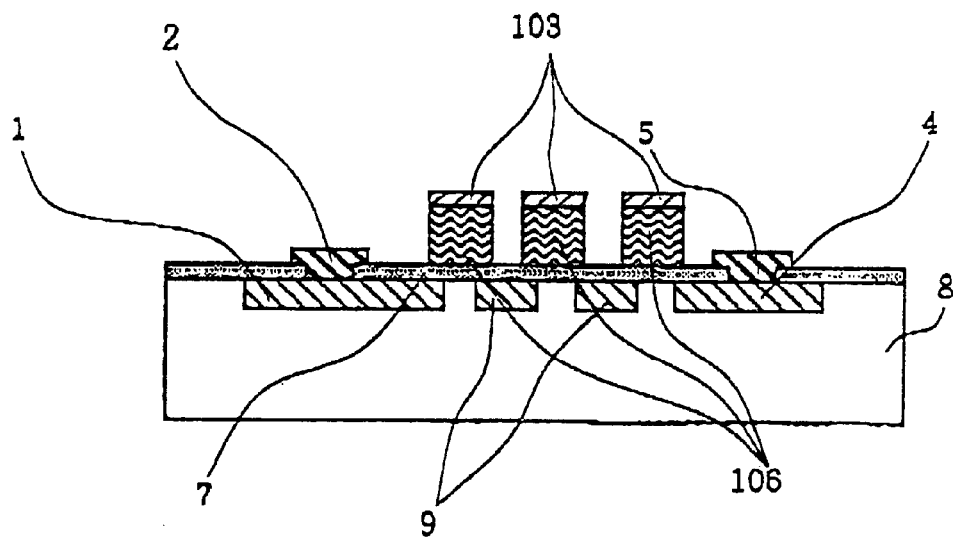
FIG. 3 is a similar view to FIG. 2 illustrating a second embodiment of a tactile sensor.
Figure 4:
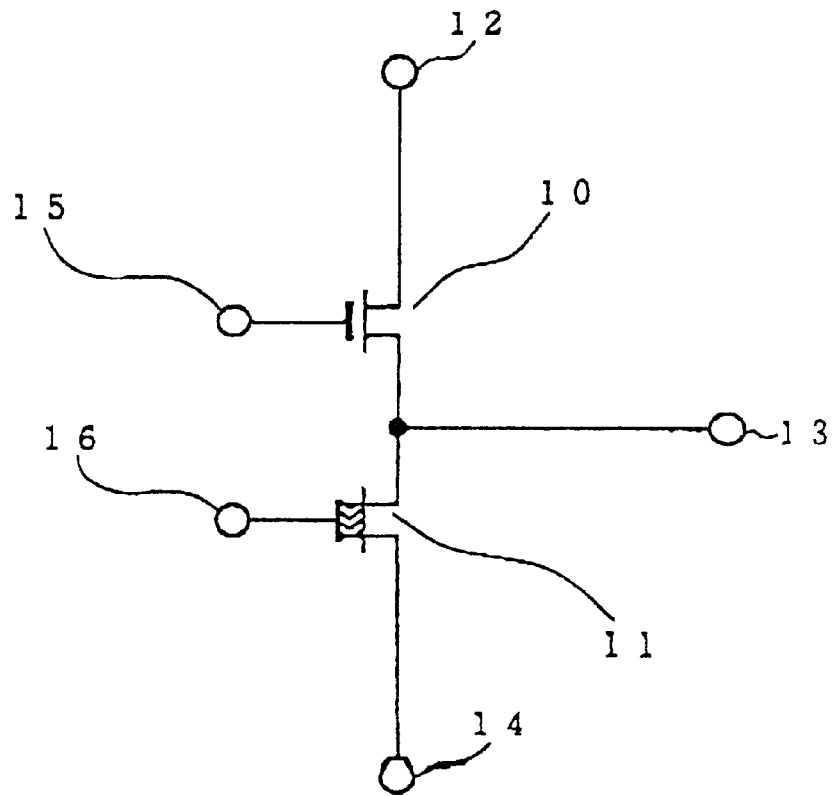
FIG. 4 illustrates a source follower circuit including the tactile sensor.
Figure 5:
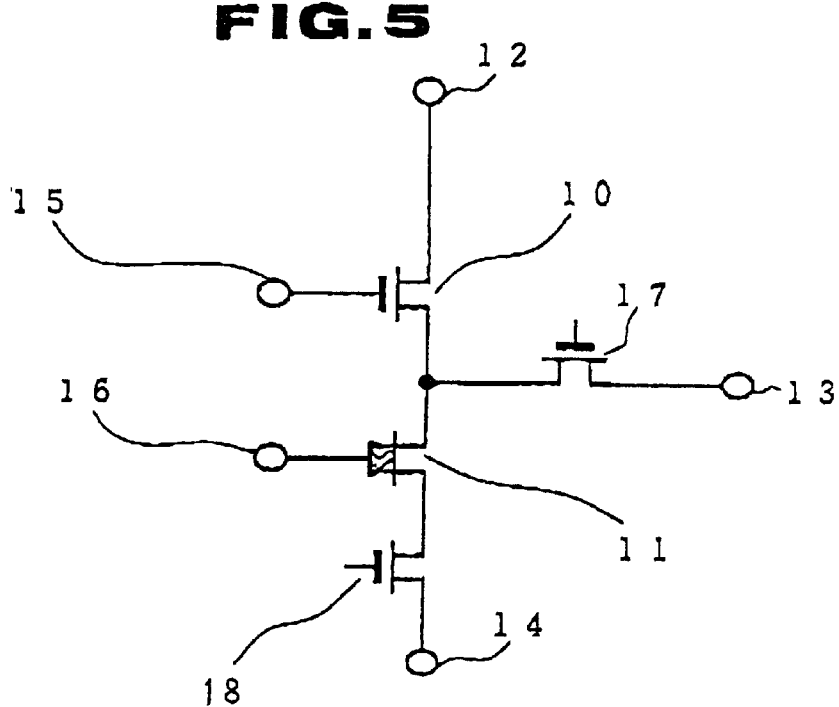
FIG. 5 illustrates a source follower circuit including the tactile sensor, with two switching elements.
Figure 6:
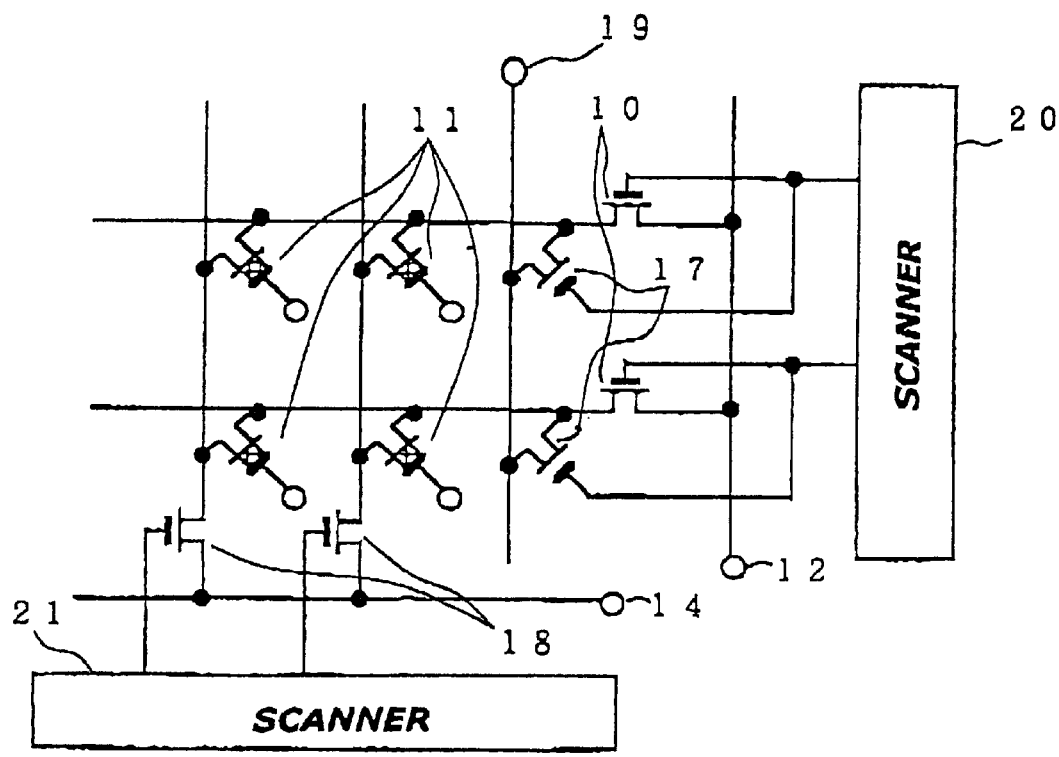
FIG. 6 is a circuit diagram of a fingerprint sensor including a plurality of tactile sensors of FIG. 2 or 3, as sensing elements, and scanners.

FIGS. 4, 5 and 6 illustrate circuit diagrams in which either the tactile sensor shown in FIGS. 1 and 2 or the tactile sensor shown in FIG. 3 may be used. FIG. 4 is a circuit diagram of a source follower circuit, FIG. 5 is a circuit diagram of another source follower circuit including switching transistors for selecting the tactile sensor. FIG. 6 is a circuit diagram of a fingerprint sensor employing a number of tactile sensors arranged in a matrix form.

Referring to FIGS. 4, 5 and 6, the reference numeral 10 designates a transistor for regulating constant current, and the reference numeral 11 a tactile sensor which may take the form of the structure as shown in FIGS. 1 and 2 or the structure as shown in FIG. 3. The reference numeral 12 designates a source of electric voltage Vs, the reference numeral 13 an output terminal, the reference numeral 14 a source of electric voltage Vd, the reference numeral 15 a source of electric voltage Vg, and the reference numeral 16 a source of electric voltage Vg'. In FIG. 5, the reference numeral 17 designates a first switching element in the form of a transistor and the reference numeral 18 a second switching element in the form of a transistor. In FIG. 6, the reference numeral 19 designates a common output terminal, and the reference numerals 20 and 21 designate scanners, respectively.

Referring to FIG. 4, the tactile sensor 11 has its drain electrode 5 connected to the output terminal 13, its source electrode 2 to the source of voltage Vd 14, and its gate electrode 3 or gate electrodes 103 to the source of voltage Vg' 16. The transistor 15 has its drain connected to the output terminal 13, its source connected to the source of voltage Vs 12, and its gate connected to the source of voltage Vg 15.

Referring to FIG. 5, this circuit is substantially the same as the circuit shown in FIG. 4 except the provision of the first and second switching transistors 17 and 18. The first switching transistor 17 is connected between the drain of the tactile sensor 11 and the output terminal 13. The second switching circuit 18 is connected between the source of the tactile sensor 11 and the source of voltage Vd 14.

In the circuit shown in FIG. 6, the tactile sensors 11 are arranged in a matrix. Each of the tactile sensors 11 has its drain connected to one of rows of the matrix, and its source connected to one of columns of the matrix, The first switching transistors 17 are arranged, each being connected between one of the rows and the common output terminal 19. The transistors 10 for regulating constant electric current are arranged, each being connected between one of the rows and the source of voltage Vs 12. The gates of the first switching transistors 17 are connected to the scanner 20. The gates of the transistors 10 are connected to the scanner 20. The second switching transistors 18 are arranged, each being connected to one of the columns and the source of electric voltage Vd 14. The gates of the second switching transistors 18 are connected to the scanner 21. The scanner 20 controls the first switching transistors 17 and the transistors 10 for regulating constant electric current. The scanner 21 controls the second switching transistors 18.

Upon being pressed with a finger, the scanners 20 and 21 scan the outputs of the tactile sensors, gathering information as to the fingerprint.

The source follower circuit processes the output of each of the tactile sensors 11, causing a reduced output resistance and a good response. Further, it provides better temperature characteristics than the FET alone does.

[Third Embodiment]

Figure 7:
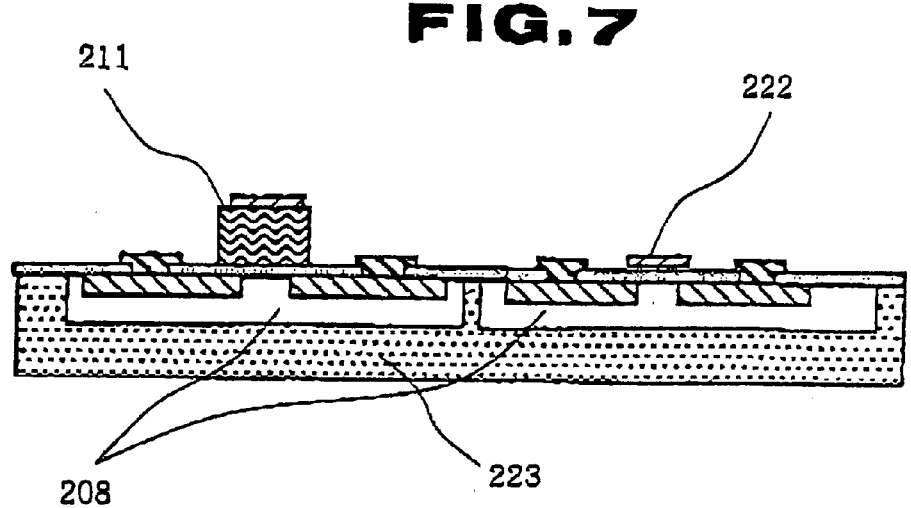
FIG. 7 is a similar view to FIG. 2 illustrating a third embodiment, in which a tactile sensor forms a pair with a MOSFET.

Referring to FIG. 7, the third embodiment is described. According to this third embodiment, a FET type tactile sensor 211, which is substantially the same as the tactile sensors shown in FIGS. 1 to 3, is used, and a complementary MOSFET 222 is arranged adjacent the sensor 211. The complementary MOSFET 222 is a usual MOSFET. Two silicon substrates namely, a first silicon substrate 208 and a second silicon substrate 223, are employed, which have different conductivity types. A p-n junction electrically separates the first and second silicon substrates 208 and 223 from each other.

The tactile sensor 211 is substantially the same as the usual MOSFET except the sensor portion. Thus, the tactile sensor 211 and the MOSFET 222 exhibit the same electric characteristics, FIGS. 8 and 9 illustrate circuit diagrams in which the structure shown in FIGS. 7 may be used.

Figure 8:
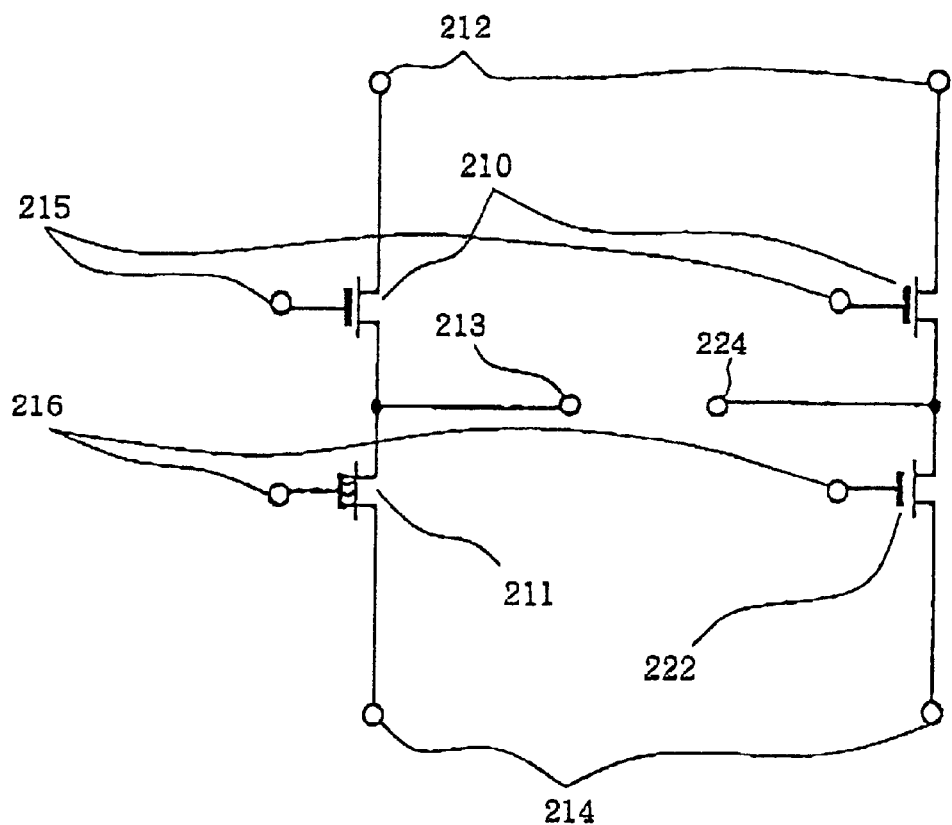
FIG. 8 illustrates source follower circuits, one including for the tactile sensor of FIG. 7, the other including the MOSFET of FIG. 7.
Figure 9:
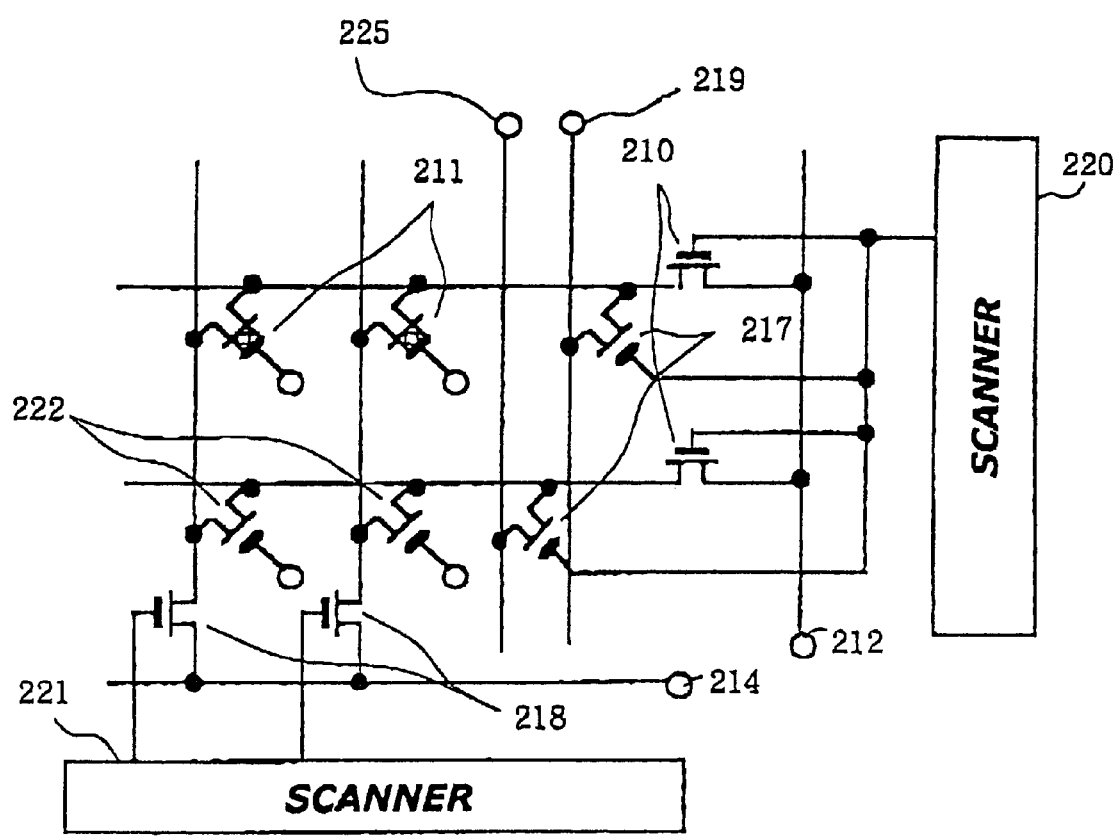
FIG. 9 is a circuit diagram of a fingerprint sensor scanner using a plurality of tactile sensor and MOSFET pairs of FIG. 7.

Referring to FIGS. 8 and 9, the reference numeral 210 designates a transistor for regulating constant current, the reference numeral 211 the tactile sensor, and the reference numeral 222 the MOSFET. The reference numeral 212 designates a source of electric voltage Vs,, the reference numeral 213 an output terminal of the tactile sensor, and the reference numeral 224 an output terminal of the MOSFET. The reference numeral 214 designates a source of electric voltage Vd, the reference numeral 215 a source of electric voltage Vg, and the reference numeral 216 a source of electric voltage Vg'. In FIG. 9, the reference numeral 219 designates a common output terminal for the tactile sensors, the reference numerals 217 a first switching transistor, and the reference numeral 218 a second switching transistor. The reference numeral reference numerals 220 and 221 designate scanners, respectively.

Referring to FIG. 8, the tactile sensor 211 and the MOSFET 222 have their drains connected to the common output terminals 213 and 214, respectively. They have their sources connected to the source of voltage Vd 214, and their gates to the source of voltage Vg' 216. The transistors 215 have their drains connected to the output terminals 213 and 224, respectively, their sources to the source of voltage Vs 212, and their gates to the source of voltage Vg 215.

In the circuit shown in FIG. 6, the tactile sensors 211 and the MOSFET 222 are arranged, in pairs, in a matrix. Each tactile sensor 211 has its drain connected to one of rows of the matrix, and its source connected to one of columns of the matrix. Each MOSFET 222 has its drain connected to one of the rows, and its source connected to one of the columns. The first switching transistors 217 are arranged, each being connected between one of the rows and the common output terminal 219, The transistors 210 for regulating constant electric current are arranged, each being connected between one of the rows and the source of voltage Vs 212. The gates of the first switching transistors 217 are connected to the scanner 220. The gates of the transistors 210 are connected to the scanner 220. The second switching transistors 218 are arranged, each being connected to one of the columns and the source of electric voltage Vd 214. The gates of the second switching transistors 218 are connected to the scanner 221. The scanner 220 controls the first switching transistors 217 and the transistors 210 for regulating constant electric current. The scanner 221 controls the second switching transistors 218.

Upon being pressed with a finger, the scanners 220 and 221 scan the outputs of the tactile sensors 211 and those of the MOSFETs 222, gathering information as to the fingerprint.

The scanners 220 and 221 derive, via the source follower circuits, the outputs of the tactile sensors 211 and the MOSFETs 222, which are formed on the same substrate and exhibit the same electric characteristics. Thus, detecting a difference between the outputs of each pair of tactile sensor 211 and MOSFET 222 eliminates the influence of external noise. Further, the source follower circuits eliminate or at least reduce to a negligible level the temperature dependence of the tactile sensors 211. Thus, there is given a fingerprint sensor with enhanced signal to noise ratio and drift characteristics.

Apparently, the present invention may be embodied in a FET formed of polycrystalline silicon that is grown on a glass substrate. In this case, each transistor is formed in one of islands of polycrystalline silicon, making it unnecessary to use two different silicon substrates as shown in FIG. 7.

Referring back to FIGS. 6 and 9, in the preceding embodiments, the matrix structures were explained as one form of a fingerprint sensor and its modification, respectively. The fingerprint sensor is not limited to this structure. For example, a row of tactile sensors may be used as a fingerprint sensor. In this case, a fingerprint may be detected by sliding a finger along the row of tactile sensors. Using the row of tactile sensors is advantageous in simplifying the overall structure of the device.

From the description of the third embodiment, it will be appreciated that a compact and thin fingerprint sensor with superior operation stability can be realized by using a source follower circuit and a complementary MOSFET. It will also be appreciated that high fidelity of the fingerprint sensor can be accomplished by using an elongate elastic body in a sensor portion of each of tactile sensors or by using a plurality of such elongate elastic bodies in the sensor portion.

What is claimed is:

1. A fingerprint sensor for converting a fingerprint information into an electric signal, comprising;
    a plurality of tactile sensors, each having
        a field-effect transistor (FET) including a source region, a drain region, a channel region between said source and drain regions, and an insulating film on said source, drain and channel regions,
        an elastic body of an insulating material on said insulating film above said channel region, and
        a member of an electrically conductive material on said elastic body;
    a constant current source transistor (CCST) connected, as a source of constant current, to each of at least some of said tactile sensors to form a source follower circuit;
    a common output terminal for tactile sensors;
    a first switching element connected between the source region of each tactile sensor, to which said transistor is connected, and said common output terminal for tactile sensors;
    a source of electric power;
    a second switching element connected between said source of electric power and said tactile sensor in each of said source follower circuits.

2. The fingerprint sensor as claimed in claim 1,
    wherein said FET has at least one heavily doped region, including at least one dopant having the same conductive type as those of said source and drain regions, which divides said channel region into a plurality of sensor regions; and
    wherein said elastic body is disposed above each of said sensor regions.

3. The fingerprint sensor as claimed in claim 2,
    wherein said elastic body extends, in an unstressed state, from said member toward said insulating film by a depth and extending between said source and drain regions by a width, and said depth is at least equal to said width.

4. The fingerprint sensor as claimed in claim 1, further comprising:
    a plurality of metal-oxide -semiconductor field-effect transistors (MOSFETs), each having the same electric characteristics as electric characteristics exhibited by said FET of each of said plurality of tactile sensors,
    each of said plurality of MOSFETs including a source region, a drain region and a channel region between said source and drain regions thereof;
    a second CCST connected, as a source of constant current, to each of at least some of said MOSFETs to form a second source follower circuit;
    a common output terminal for MOSFETs; and
    a third switching element connected between the source region of each MOSFET, to which said second CCST is connected, and said common output terminal for MOSFETs;
    said second switching element being connected between said source of electric power and said MOSFET in each of said second source follower circuits.

5. The fingerprint sensor as claimed in claim 1,
    wherein said plurality of tactile sensors are arranged in a matrix, which has a plurality of rows and a plurality of columns;
    wherein said first switching element is connected to each of said plurality of rows; and
    wherein said second switching element is connected to each of said plurality of columns.

6. The fingerprint sensor as claimed in claim 1, further comprising;
    a plurality of metal-oxide-semiconductor field-effect transistors (MOSFETs), each having the same electric characteristics as electric characteristics exhibited by said FET of each of said plurality of tactile sensors,
    each of said plurality of MOSFETs including a source region, a drain region and a channel region between said source and drain regions thereof;
    a second CCST connected, as a source of constant current, to each of at least some of said MOSFETs to form a second source follower circuit;
    a common output terminal for MOSFETs; and
    a third switching element connected between the source region of each MOSFET, to which said second CCST is connected, and said common output terminal for MOSFETs;
    said second switching element being connected between said source of electric power and said MOSFET in each of said second source follower circuits;
    wherein said plurality of tactile sensors and said plurality of MOSFETs are arranged in pairs in a matrix;
    wherein said first switching element is connected to each of said plurality of rows of said tactile sensors; and
    wherein said second switching element is connected to each of said plurality of columns of said tactile sensors and said MOSFETs; and
    wherein said third switching element is connected to each of said plurality of rows of said MOSFETs.

7. The fingerprint sensor as claimed in claim 5, further comprising scanners for controlling said first and second switching elements to sequentially detects outputs from said plurality of tactile sensors.

8. The fingerprint sensor as claimed in claim 6, further comprising scanners for controlling said first, second and third switching elements to sequentially determine a difference in voltage between each pair of first mentioned source follower circuit and second source follower circuit.

* * * * *